United States Patent
O'Hara et al.

(10) Patent No.: US 11,230,114 B2
(45) Date of Patent: Jan. 25, 2022

(54) VALVES WITH PRINT SUBSTANCE AND AIR CHANNELS

(71) Applicant: Hewlett-Packard Development Company, L.P., Spring, TX (US)

(72) Inventors: Steve A. O'Hara, Vancouver, WA (US); Kenneth Williams, Vancouver, WA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/767,484

(22) PCT Filed: Aug. 30, 2018

(86) PCT No.: PCT/US2018/048870
§ 371 (c)(1),
(2) Date: May 27, 2020

(87) PCT Pub. No.: WO2020/046344
PCT Pub. Date: Mar. 5, 2020

(65) Prior Publication Data
US 2020/0384776 A1 Dec. 10, 2020

(51) Int. Cl.
*G03G 15/08* (2006.01)
*B41J 2/175* (2006.01)
(52) U.S. Cl.
CPC ...... *B41J 2/17596* (2013.01); *G03G 15/0865* (2013.01)
(58) Field of Classification Search
CPC ............ G03G 15/0865; G03G 15/0886; B41J 2/17556; B41J 2/17596

USPC ........ 399/107, 110, 111, 119, 120, 252, 258, 399/262
See application file for complete search history.

(56) References Cited

U.S. PATENT DOCUMENTS

| | | | |
|---|---|---|---|
| 4,538,653 A | 9/1985 | Shea | |
| 5,903,293 A | 5/1999 | Nikkels et al. | |
| 6,935,730 B2* | 8/2005 | Qingguo | B41J 2/17506 347/86 |
| 7,364,281 B2 | 4/2008 | Yan | |
| 7,805,092 B2 | 9/2010 | Mihara | |
| 8,565,649 B2* | 10/2013 | Murakami | G03G 15/0872 399/258 |
| 8,849,162 B2* | 9/2014 | Leemhuis | G03G 15/0886 399/258 |
| 8,977,160 B2* | 3/2015 | Buchanan | G03G 15/0886 399/106 |
| 9,128,412 B2* | 9/2015 | Leemhuis | G03G 15/0896 |

(Continued)

FOREIGN PATENT DOCUMENTS

JP 4825488 11/2011

*Primary Examiner* — Hoan H Tran
(74) *Attorney, Agent, or Firm* — Brooks Cameron & Huebsch PLLC

(57) ABSTRACT

In some examples, an apparatus can include a valve body including a valve body print substance channel and a valve body air channel, a valve socket shaped to receive the valve body, where the valve socket includes a valve socket print substance channel and a valve socket air channel, where the valve body is in a closed position such that the valve body print substance channel and the valve socket print substance channel are misaligned, and the valve body air channel and the valve socket air channel are misaligned.

14 Claims, 5 Drawing Sheets

(56) References Cited

U.S. PATENT DOCUMENTS

| | | |
|---|---|---|
| 9,975,345 B2 | 5/2018 | Tamarez Gomez |
| 2009/0162103 A1 | 6/2009 | Wayman |
| 2010/0254731 A1 | 10/2010 | Centofante |

* cited by examiner

VALVES WITH PRINT SUBSTANCE AND AIR CHANNELS

BACKGROUND

Imaging systems, such as printers, copiers, etc., may be used to form markings on a physical medium, such as text, images, etc. In some examples, imaging systems may form markings on the physical medium by performing a print job. A print job can include forming markings such as text and/or images by transferring a print substance (e.g., ink, toner, etc.) to the physical medium.

DETAILED DESCRIPTION

Imaging devices may include a supply of a print substance located in a reservoir. As used herein, the term "print substance" refers to a substance which, when applied to a medium, can form representation(s) (e.g., text, images models, etc.) on the medium during a print job.

The print substance can be deposited onto a physical medium. As used herein, the term "imaging device" refers to any hardware device with functionalities to physically produce representation(s) (e.g., text, images, models, etc.) on the medium. In some examples, a "medium" may include paper, photopolymers, plastics, composite, metal, wood, or the like.

The reservoir including the print substance may be inside of the imaging device and include a supply of the print substance such that the imaging device may draw the print substance from the reservoir as the imaging device creates the images on the print medium. As used herein, the term "reservoir" refers to a container, a tank, and/or a similar vessel to store a supply of the print substance for use by the imaging device.

As the imaging device draws the print substance from the reservoir, the amount of print substance in the reservoir may deplete. As a result, the amount of print substance in the reservoir of the imaging device may have to be replenished.

Transferring print substance to the reservoir of the imaging device can include venting air in the imaging device reservoir as the print substance is transferred. For example, as the volume of print substance in the imaging device reservoir increases, the air in the imaging device reservoir has to be removed.

Valves with print substance and air channels, according to the disclosure, can allow for venting of air as the imaging device reservoir receives print substance. The valve can include separate print substance and air channels such that print substance can be quickly transferred to the imaging device reservoir.

Figure 1:
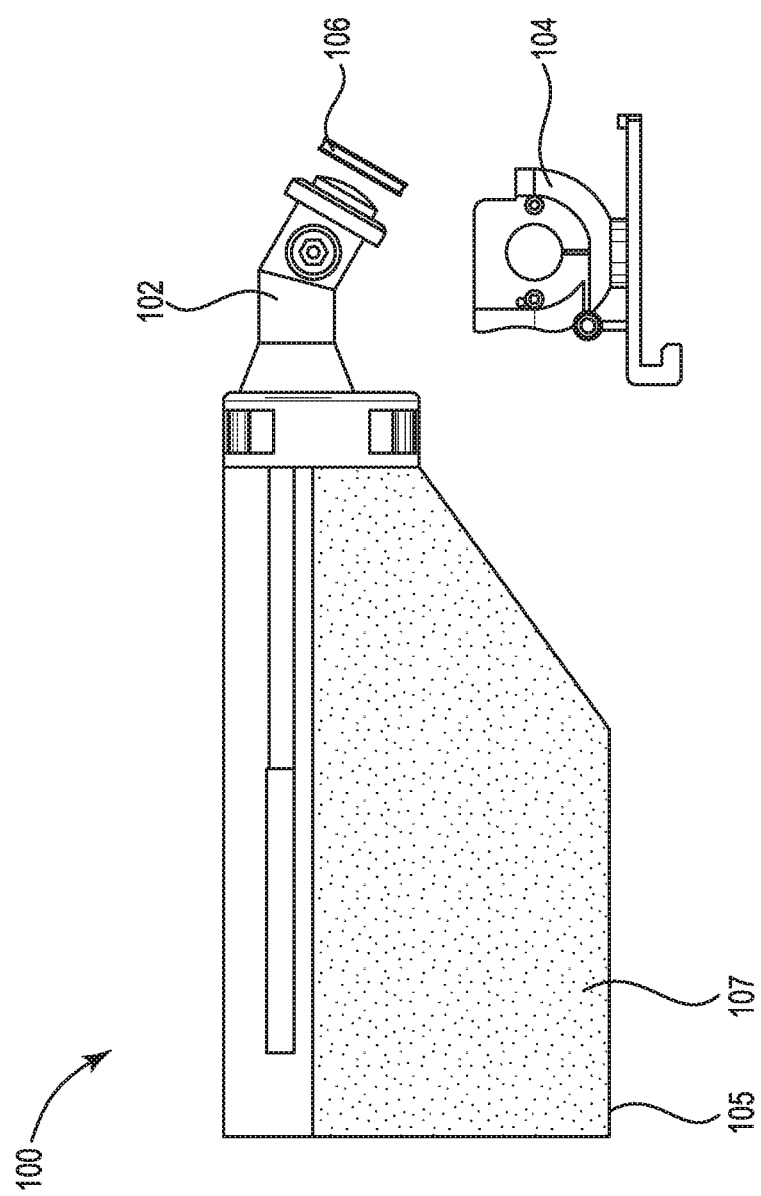
FIG. 1 illustrates an exploded view of an example of an apparatus consistent with the disclosure.

FIG. 1 illustrates an exploded view of an example of an apparatus 100 consistent with the disclosure. Apparatus 100 can include a valve body 102, a valve socket 104, a supply reservoir 105, an elastomeric seal 106, and print substance 107.

As illustrated in FIG. 1, apparatus 100 can include a valve body 102. As used herein, the term "valve body" refers to a physical structure of a valve. As used herein, the term "valve" refers to a device to control the flow of a liquid, gas, or other material through a channel. For example, valve body 102 can include channels through which a material can flow, and valve body 102 can control the flow of the material through the channels.

Although not illustrated in FIG. 1 for clarity and so as not to obscure examples of the disclosure, valve body 102 can include a valve body print substance channel and a valve body air channel. For example, print substance can flow through the valve body print substance channel from supply reservoir 105 and air can flow through the valve body air channel into supply reservoir 105, as is further described in connection with FIGS. 2-4.

Apparatus 100 can include a valve socket 104. As used herein, the term "valve socket" refers to a part or piece of a part to receive and hold another part. For example, valve socket 104 can receive and hold valve body 102, as is further described in connection with FIGS. 2 and 3.

Although not illustrated in FIG. 1 for clarity and so as not to obscure examples of the disclosure, valve socket 104 can include a valve socket print substance channel and a valve socket air channel. For example, print substance can flow through the valve socket print substance channel from supply reservoir 105 when valve body 102 is in an open position and air can flow through the valve socket air channel into supply reservoir 105 when valve body 102 is in an open position, as is further described in connection with FIGS. 2-4.

Apparatus 100 can include supply reservoir 105. Supply reservoir 105 can include print substance 107. Apparatus 100 may be utilized to fill and/or refill a reservoir of an imaging device with print substance 107, as is further described in connection with FIG. 4.

Valve body 102 can include elastomeric seal 106. As used herein, the term "elastomeric seal" refers to an elastomer material that prevents transfer of material from one side to the other. For example, elastomeric seal 106 can provide a fluid tight seal at an interface between valve body 102 and valve socket 104. The fluid tight seal can prevent print substance 107 from transferring outside of the interface between valve body 102 and valve socket 104.

In some examples, elastomeric seal 106 can be an elastomer material. In some examples, elastomeric seal 106 can be an elastomer and polymer blend. For example, elastomeric seal 106 can be an elastomer such as ethylene propylene rubber, ethylene propylene diene monomer rubber, neoprene, and blends of thermoplastic polymers and elastomers, such as for example, thermoplastic elastomers and rubber toughened plastics, among other examples of materials.

Figure 2:
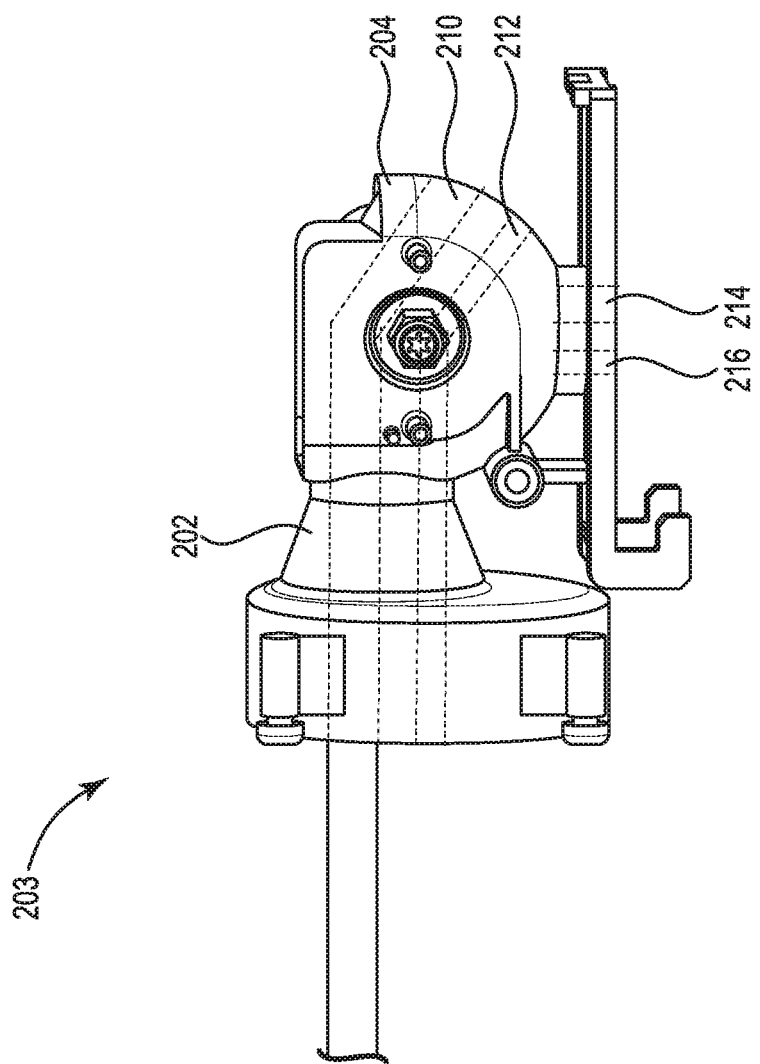
FIG. 2 illustrates an example of an apparatus consistent with the disclosure.

FIG. 2 illustrates an example of an apparatus 203 consistent with the disclosure. Apparatus 203 can include a valve body 202 and a valve socket 204.

Valve body 202 can include valve body print substance channel 212. As used herein, the term "channel" refers to a tubularly or other shaped passage through which a material, such as a liquid or fluid, can flow. As used herein, the term "valve body print substance channel" refers to a channel in valve body 202 through which a print substance can flow. For example, although not illustrated in FIG. 2 for clarity and so as not to obscure examples of the disclosure, apparatus 203 can include a supply reservoir. The supply reservoir can include print substance which can flow through valve body print substance channel 212, as is further described herein with respect to FIG. 4.

Valve body 202 can include valve body air channel 210. As used herein, the term "valve body air channel" refers to a channel in valve body 202 through which air can flow. For example, although not illustrated in FIG. 2 for clarity and so as not to obscure examples of the disclosure, apparatus 203 can include a supply reservoir. Air can flow from a reservoir of an imaging device to the supply reservoir of apparatus 203 via valve body air channel 210, as is further described herein with respect to FIG. 4.

Valve socket 204 can include valve socket print substance channel 216. As used herein, the term "valve socket print substance channel" refers to a channel in valve socket 204 through which a print substance can flow. For example, although not illustrated in FIG. 2 for clarity and so as not to obscure examples of the disclosure, apparatus 203 can include a supply reservoir. The supply reservoir can include print substance which can flow through valve socket print substance channel 216, as is further described herein with respect to FIG. 4.

Valve socket 204 can include valve socket air channel 214. As used herein, the term "valve socket air channel" refers to a channel in valve socket 204 through which air can flow. For example, although not illustrated in FIG. 2 for clarity and so as not to obscure examples of the disclosure, apparatus 203 can include a supply reservoir. Air can flow from a reservoir of an imaging device to the supply reservoir of apparatus 203 via valve socket air channel 214, as is further described herein with respect to FIG. 4.

As illustrated in FIG. 2, valve body 202 can be in a closed position. For example, when valve body 202 is in the closed position, print substance from the supply reservoir of apparatus 203 is not able to flow from the supply reservoir, through valve body print substance channel 212, and through valve socket print substance channel 216 into a reservoir of an imaging device. Additionally, air is not able to flow from the reservoir of the imaging device, through valve socket air channel 214, and through valve body air channel 210 into the supply reservoir of apparatus 203. In other words, when valve body 202 is in the closed position, print substance is unable to be transferred out of the supply reservoir of apparatus 203.

Print substance is unable to be transferred out of the supply reservoir of apparatus 203 when the valve body 202 is in the closed position as a result of the valve body print substance channel 212 and the valve socket print substance channel 216 being misaligned. As used herein, the term "misaligned" refers to two channels not being properly aligned such that flow of material is unable to occur between the two channels. For example, print substance is unable to flow from valve body print substance channel 212 to valve socket print substance channel 216.

Additionally, print substance is unable to flow out of the supply reservoir of apparatus 203 when the valve body 202 is in the closed position as a result of air not being able to flow from a reservoir of an imaging device into the supply reservoir of apparatus 203 as a result of the valve body air channel 210 and the valve socket air channel 214 being misaligned. For example, air is unable to flow from valve socket air channel 214 to valve body air channel 210.

Figure 3:
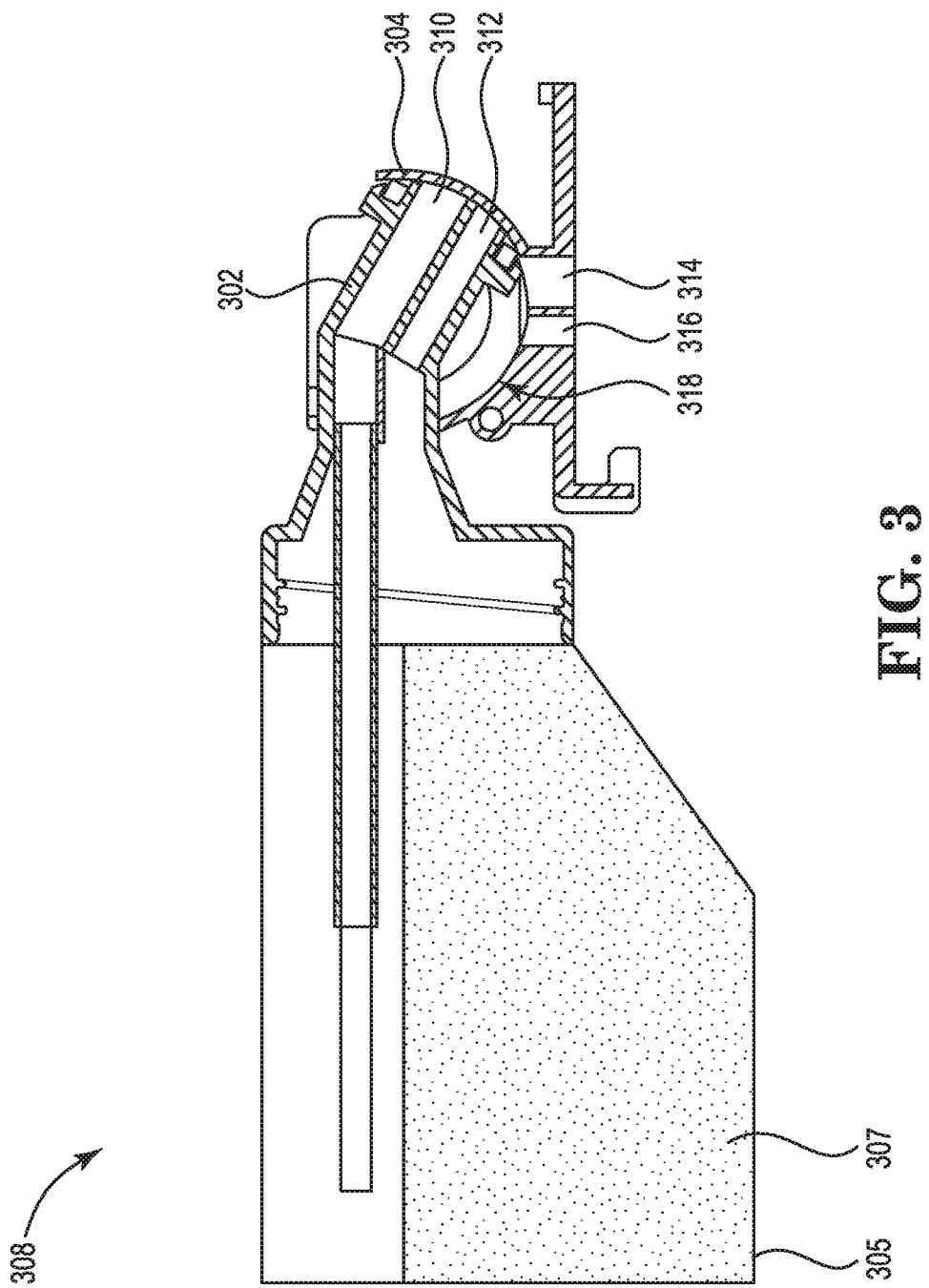
FIG. 3 illustrates a cutaway view of an example of a system including a valve body in a closed position and a valve socket consistent with the disclosure.

FIG. 3 illustrates a cutaway view of an example of a system 308 including a valve body 302 in a closed position and a valve socket 304 consistent with the disclosure. System 308 includes valve body 302, valve socket 304, and supply reservoir 305. Supply reservoir 305 can include print substance 307.

Valve body 302 can include valve body print substance channel 312. Supply reservoir 305 can include print substance which can flow through valve body print substance channel 312 when valve body 302 is in an open position, as is further described herein with respect to FIG. 4.

Valve body 302 can include valve body air channel 310. Air can flow from a reservoir of an imaging device to the supply reservoir 305 via valve body air channel 310 when valve body 302 is in an open position, as is further described herein with respect to FIG. 4.

Valve socket 304 can include valve socket print substance channel 316. Supply reservoir 305 can include print substance 307 which can flow through valve socket print substance channel 316 when valve body 302 is in an open position, as is further described herein with respect to FIG. 4.

Valve socket 304 can include valve socket air channel 314. Air can flow from a reservoir of an imaging device to supply reservoir 305 via valve socket air channel 314 when valve body 302 is in an open position, as is further described herein with respect to FIG. 4.

Valve socket 304 can include a concave surface 308. As used herein, the term "concave surface" refers to a surface which is curved inwards. For example, concave surface 308 of valve socket 304 can include a curved surface, as illustrated in FIG. 3.

Valve body 302 can be convexly shaped. As used herein, the term "convex" refers to a surface that is curved or rounded outwards. For example, valve body 302 can be outwardly rounded in shape.

Valve body 302 can be convexly shaped such that valve socket 304 can receive and secure valve body 302. Valve body 302 can be convexly shaped such that valve body 302 can be located adjacent to the concave surface 318 of valve socket 304.

As illustrated in FIG. 3, valve body 302 can be in a closed position. For example, when valve body 302 is in the closed position, print substance 307 from supply reservoir 305 is not able to flow from supply reservoir 305, through valve body print substance channel 312, and through valve socket print substance channel 316 into a reservoir of an imaging device. Additionally, air is not able to flow from the reservoir of the imaging device, through valve socket air channel 314, and through valve body air channel 310 into supply reservoir 305. In other words, when valve body 302 is in the closed position, print substance is unable to be transferred out of supply reservoir 305.

When valve body 302 is in the closed position, valve body print substance channel 312 and valve socket print substance channel 316 are misaligned. For example, print substance 307 is unable to flow from valve body print substance channel 312 to valve socket print substance channel 316.

Additionally, when valve body 302 is in the closed position, air is not able to flow from a reservoir of an imaging device into supply reservoir 305 as a result of the valve body air channel 310 and the valve socket air channel 314 being misaligned. For example, air is unable to flow from valve socket air channel 314 to valve body air channel 310.

Figure 4:
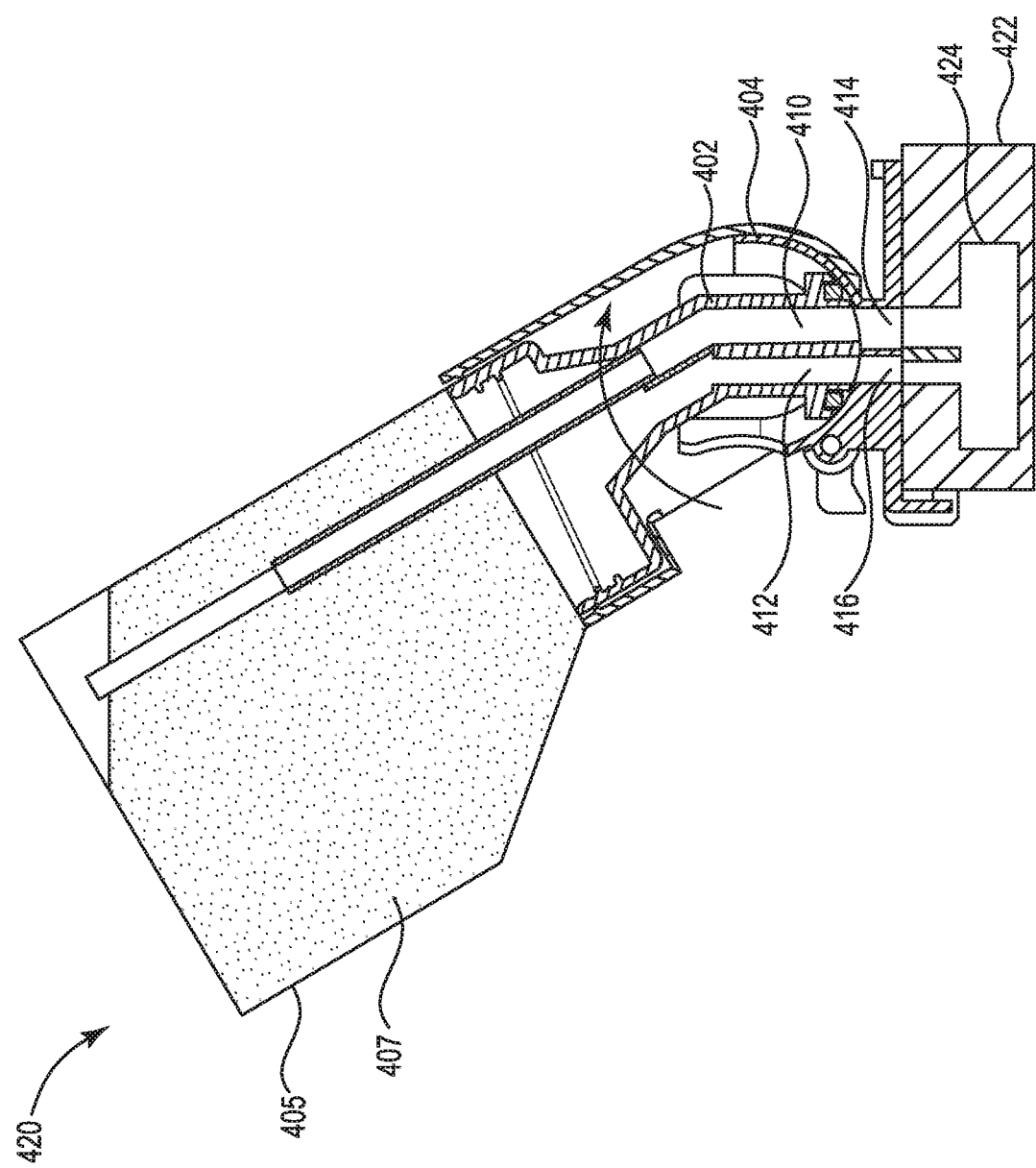
FIG. 4 illustrates a cutaway view of an example of a print substance supply including a valve body in an open position and a valve socket consistent with the disclosure.

FIG. 4 illustrates a cutaway view of an example of a print substance supply 420 including a valve body 402 in an open position and a valve socket 404 consistent with the disclosure. Print substance supply 420 includes valve body 402, valve socket 404, and supply reservoir 405. Supply reservoir 405 can include print substance 407. Also illustrated in FIG. 4 is imaging device 422. Imaging device 422 can include reservoir 424 of imaging device 422.

As previously described in connection with FIGS. 1-3, valve body 402 can include valve body print substance channel 412 and valve body air channel 410. Additionally, valve socket 404 can include valve socket print substance channel 416 and valve socket air channel 414.

Valve socket 404 can include a concave surface. Valve body 402 can be convexly shaped such that valve socket 404 can receive and secure valve body 402. Valve body 402 can be located adjacent to the concave surface of valve socket 404.

As previously described in connection with FIGS. 1-3, valve body can be in a closed position to prevent print substance 407 from being transferred out of supply reservoir 405. As illustrated in FIG. 4, valve body 402 can be in an open position. In other words, valve body 402 (and supply reservoir 405) can be rotated from the closed position to the open position.

For example, as illustrated in FIG. 4, valve body 402 can be rotated relative to valve socket 404 from the closed position to the open position. Valve body 402 can be rotated in a clockwise direction, as oriented in FIG. 4, from the closed position to the open position.

Valve body 402 can be rotated by a particular angle to be rotated from the closed position to the open position. For example, the amount of rotation from the closed position to the open position can be 60°. For instance, valve body 402, in the closed position, can be at an angle of 0° (e.g., relative to a horizontally oriented line relative to imaging device 422), and valve body 402 can rotate 60° from imaging device 422 to the open position.

Although the open position of valve body 402 is described above as being 60°, examples of the disclosure are not so limited. For example, valve body 402 can be at the open position at less than 60° or more than 60°.

Valve body 402 can be at an open position such that valve body print substance channel 412 and valve socket print substance channel 416 are aligned. As used herein, the term "aligned" refers to two channels being properly aligned such that flow of material is able to occur between the two channels. For example, print substance 407 is able to flow from supply reservoir 405 through valve body print substance channel 412 and through valve socket print substance channel 416.

Additionally, when valve body 402 is at the open position, valve body air channel 410 and valve socket air channel 414 are aligned. For example, air is able to flow from reservoir 424 of imaging device 422 through valve socket air channel 414 and through valve body air channel 410.

When valve body 402 is at the open position, the valve body print substance channel 412 and valve socket print substance channel 416 provide a direct path from supply reservoir 405 to reservoir 424 of imaging device 422. In other words, print substance 407 is able to flow from supply reservoir 405 to reservoir 424 of imaging device 422 without any intervening obstacles.

Additionally, when valve body 402 is at the open position, the valve body air channel 410 and valve socket air channel 414 provide a direct path from reservoir 424 of imaging device 422 and supply reservoir 405. In other words, air is able to flow from reservoir 424 to supply reservoir 405 without any intervening obstacles.

Print substance 407 from supply reservoir 405 can be provided to reservoir 424 of imaging device 422 via the aligned valve body print substance channel 412 and valve socket print substance channel 416. As imaging device 422 draws print substance from reservoir 424, the amount of print substance in the reservoir may deplete during a print job as print substance is applied to a medium to form representation(s) on the medium. Therefore, a fill and/or refill operation may be performed to fill reservoir 424 with print substance. During a fill and/or refill operation, print substance 407 can be transferred from supply reservoir 405 to reservoir 424 of imaging device 422.

As print substance 407 is provided to reservoir 424 of imaging device 422, air in reservoir 424 can be displaced. Accordingly, air from reservoir 424 of imaging device 422 can be vented to supply reservoir 405 via the aligned valve body air channel 410 and valve socket air channel 414. As used herein, the term "vented" refers to releasing or discharging. For example, air from reservoir 424 of imaging device 422 can be released/discharged from reservoir 424 of imaging device 422 to supply reservoir 405.

The amount of print substance 407 supplied to reservoir 424 from supply reservoir 405 can be a same amount of air vented from reservoir 424 of imaging device 422 to supply reservoir 405. For example, there can be an equal and opposite volumetric flow of print substance 407 to reservoir 424 and air to supply reservoir 405. In other words, the exchange of volume of print substance 407 from supply reservoir 405 to reservoir 424 and the volume of air from reservoir 424 to supply reservoir 405 is the same. For example, supply reservoir 405 can include one liter of print substance 407 and can supply one liter of print substance 407.

Although supply reservoir 405 is described above as supplying one liter of print substance 407, examples of the disclosure are not so limited. For example, supply reservoir 405 can supply more than one liter or less than one liter of print substance 407.

Reservoir 424 may be partially filled with print substance 407. In some examples, supply reservoir 405 may supply print substance 407 until reservoir 424 is filled with print substance. In such an example, the supply of print substance 407 from supply reservoir 405 to reservoir 424 of imaging device 422 can be stopped in response to valve socket air channel 414 being obstructed. For example, when reservoir 424 of imaging device 422 has received an amount of print substance 407 from supply reservoir 405 such that reservoir 424 is full, the received print substance 407 in reservoir 424 can obstruct valve socket air channel 414. As a result of the obstruction of valve socket air channel 414 and due to the equal and opposite volumetric flow of print substance 407 to reservoir 424 and air to supply reservoir 405, the flow of print substance 407 from supply reservoir 405 to reservoir 424 can be stopped. When the flow of print substance 407 from supply reservoir 405 is stopped, the fill and/or refill operation of reservoir 424 of imaging device 422 can be complete.

In some examples, reservoir 424 may be partially filled with print substance 407 until supply reservoir 405 is depleted of print substance 407. In such an example, the supply of print substance 407 from supply reservoir 405 to reservoir 424 of imaging device 422 can be stopped when the print substance 407 is depleted from supply reservoir 405.

When the fill/refill operation is complete, print substance supply 420 can be removed from imaging device 422. In order to remove print substance supply 420 from imaging device 422, valve body 402 can be rotated from the open position (e.g., as illustrated in FIG. 4) to the closed position (e.g., as illustrated in FIGS. 1-3). Valve body 402 can be rotated from the open position to the closed position in a counter-clockwise direction (e.g., as oriented in FIG. 4).

As previously described, when valve body 402 is in the closed position, valve body print substance channel 412 and valve socket print substance channel 416 are misaligned. Further, valve body air channel 410 and valve socket air channel 414 are misaligned. As a result of the misalignment of valve body print substance channel 412/valve socket print substance channel 416 and valve body air channel 410/valve socket air channel 414, print substance 407 is unable to be supplied form supply reservoir 405 to reservoir 424 of imaging device 422.

An apparatus having valves with print substance and air channels can allow for venting of air as an imaging device reservoir is filled with print substance. The rotation of the valve body including the print substance channel and air channel can allow for a direct path from a supply reservoir through the valve and to the imaging device reservoir, which can allow for quick transfer of print substance to the imaging device reservoir. Additionally, the actuation (e.g., from closed to open position) of the valve can enable the flow of print substance from the supply reservoir to the reservoir of the imaging device without having a secondary lever to actuate the valve, which may cause a user to have to provide a high amount of force to create a fluid tight seal and/or actuate the valve. Further, actuating the valve/valve housing, according to examples of the disclosure, can include rotation of the valve body rather than a downward motion which may be difficult to perform in a cramped space where a valve with a secondary lever may attach to an imaging device.

Figure 5:
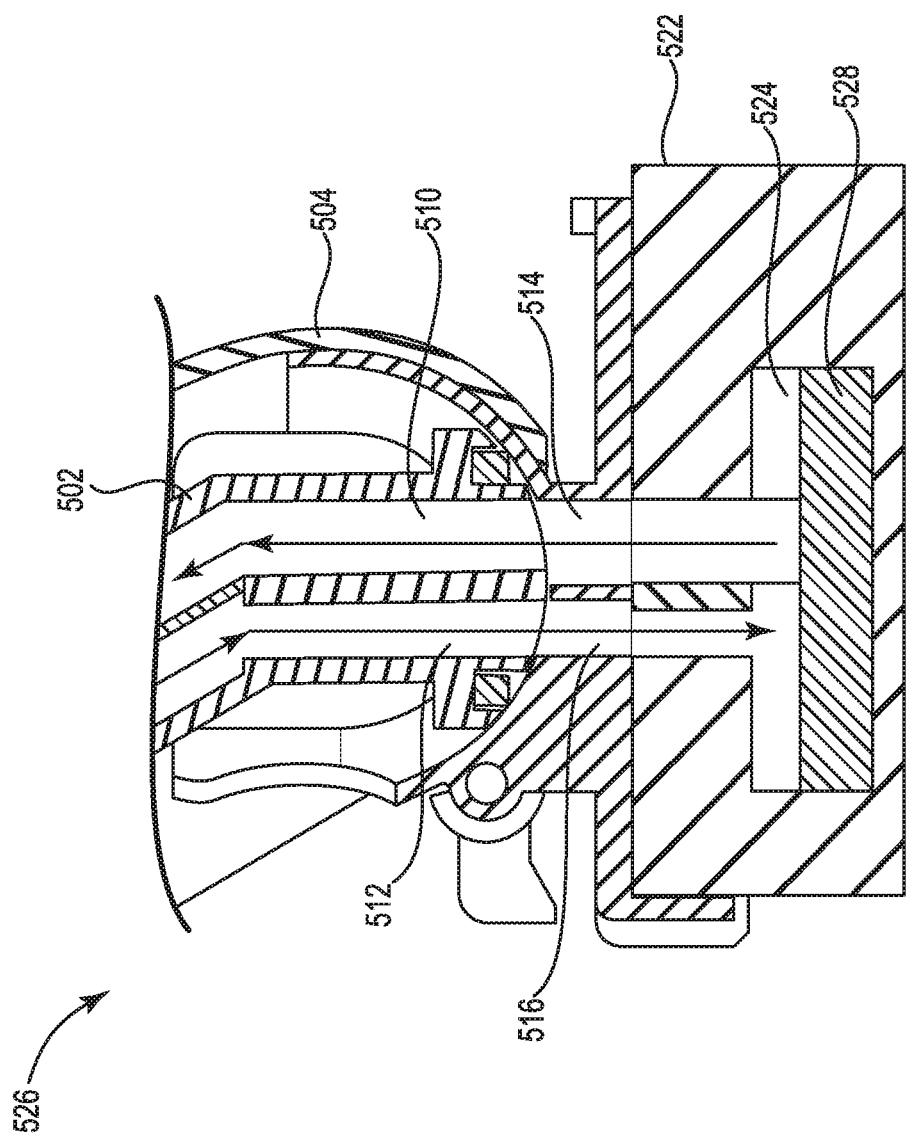
FIG. 5 illustrates an example of a portion of a cutaway view of an example of a print substance supply including a valve body in an open position and a valve socket consistent with the disclosure.

FIG. 5 illustrates an example of a portion of a cutaway view of an example of a print substance supply 526 including a valve body in an open position and a valve socket consistent with the disclosure. Print substance supply 526 includes valve body 502 and valve socket 504. Valve body 502 can include valve body print substance channel 512 and valve body air channel 510. Valve socket 504 can include valve socket print substance channel 516 and valve socket air channel 514. Also illustrated in FIG. 5 is imaging device 522. Imaging device 522 can include reservoir 524 of imaging device 522, and reservoir 524 can include print substance 528.

As previously described in connection with FIG. 4, print substance from a supply reservoir of print substance supply 526 can be provided to reservoir 524 of imaging device 522 via the aligned valve body print substance channel 512 and valve socket print substance channel 516. As print substance is provided to reservoir 524 of imaging device 522, air in reservoir 524 can be displaced. In other words, air in reservoir 524 can be vented via the aligned valve body air channel 510 and valve socket air channel 514.

Supply of print substance from the supply reservoir to reservoir 524 of imaging device 522 can be stopped in response to valve socket air channel 514 being obstructed. For example, print substance 528, received by reservoir 524 from print substance supply 526, can fill reservoir 524 to the point that valve socket air channel 514 is obstructed by the received print substance 528. As a result of the obstruction of valve socket air channel 514 and due to the equal and opposite volumetric flow of print substance from print substance supply 526 to reservoir 524 and air to the supply reservoir of print substance supply 526, the flow of print substance from the supply reservoir to reservoir 524 can be stopped. When the flow of print substance from the supply reservoir is stopped, the fill and/or refill operation of reservoir 524 of imaging device 522 can be complete.

In the foregoing detailed description of the disclosure, reference is made to the accompanying drawings that form a part hereof, and in which is shown by way of illustration how examples of the disclosure may be practiced. These examples are described in sufficient detail to enable those of ordinary skill in the art to practice the examples of this disclosure, and it is to be understood that other examples may be utilized and that process, electrical, and/or structural changes may be made without departing from the scope of the disclosure. Further, as used herein, "a" can refer to one such thing or more than one such thing.

The figures herein follow a numbering convention in which the first digit corresponds to the drawing figure number and the remaining digits identify an element or component in the drawing. For example, reference numeral 102 may refer to element 102 in FIG. 1 and an analogous element may be identified by reference numeral 202 in FIG. 2. Elements shown in the various figures herein can be added, exchanged, and/or eliminated to provide additional examples of the disclosure. In addition, the proportion and the relative scale of the elements provided in the figures are intended to illustrate the examples of the disclosure, and should not be taken in a limiting sense.

It can be understood that when an element is referred to as being "on," "connected to", "coupled to", or "coupled with" another element, it can be directly on, connected, or coupled with the other element or intervening elements may be present. In contrast, when an object is "directly coupled to" or "directly coupled with" another element it is understood that are no intervening elements (adhesives, screws, other elements) etc.

The above specification, examples and data provide a description of the method and applications, and use of the system and method of the disclosure. Since many examples can be made without departing from the spirit and scope of the system and method of the disclosure, this specification merely sets forth some of the many possible example configurations and implementations.

What is claimed is:

1. An apparatus, comprising:
    a valve body including a valve body print substance channel and a valve body air channel;
    a valve socket shaped to receive the valve body, wherein the valve socket includes a concave surface, a valve socket print substance channel, and a valve socket air channel;
    wherein when the valve body is in a closed position:
        the valve body print substance channel and the valve socket print substance channel are misaligned; and
        the valve body air channel and the valve socket air channel are misaligned.

2. The apparatus of claim 1, wherein the valve body is convexly shaped such that the valve body is adjacent to the concave surface of the valve socket.

3. The apparatus of claim 2, wherein the valve body includes an elastomeric seal such that a fluid tight seal is provided at the interface between the convex valve body and the concave surface of the valve socket.

4. The apparatus of claim 1, wherein the valve body rotates relative to the valve socket from the closed position to an open position.

5. The apparatus of claim 4, wherein the valve body is in the open position such that:
the valve body print substance channel and the valve socket print substance channel are aligned; and
the valve body air channel and the valve socket air channel are aligned.

6. The apparatus of claim 5, wherein the apparatus further includes a supply reservoir having print substance such that, in response to the valve body being in the open position:
the print substance from the supply reservoir is provided to a reservoir of an imaging device via the aligned valve body print substance channel and the valve socket print substance channel; and
air from the reservoir of the imaging device is vented to the supply reservoir via the aligned valve body air channel and the valve socket air channel.

7. A system, comprising:
a supply reservoir including print substance;
a valve socket, wherein the valve socket includes:
a concave surface;
a valve socket print substance channel; and
a valve socket air channel;
a valve body having a convex shape and located adjacent to the concave surface of the valve socket, the valve body including:
a valve body print substance channel that is misaligned with the valve socket print substance channel in response to the valve body being in a closed position; and
a valve body air channel that is misaligned with the valve socket air channel in response to the valve body being in the closed position;
wherein the valve body is rotated from the closed position to an open position such that:
the valve body print substance channel and the valve socket print substance channel are aligned to supply the print substance from the supply reservoir to a reservoir of an imaging device; and
the valve body air channel and the valve socket air channel are aligned to vent air from the reservoir of the imaging device to the supply reservoir.

8. The system of claim 7, wherein the valve body print substance channel and the valve socket print substance channel provide a direct path from the supply reservoir to the reservoir of the imaging device in response to the valve body print substance channel and the valve socket print substance channel being aligned.

9. The system of claim 7, wherein the valve body air channel and the valve socket air channel provide a direct path from the supply reservoir to the reservoir of the imaging device in response to the valve body air channel and the valve socket air channel being aligned.

10. The system of claim 7, wherein an amount of print substance supplied to the reservoir of the imaging device from the supply reservoir is a same amount of air vented from the reservoir of the imaging device to the supply reservoir.

11. The system of claim 7, wherein the supply of the print substance from the supply reservoir to the reservoir of the imaging device is stopped in response to the valve socket air channel being obstructed.

12. A print substance supply, comprising:
a supply reservoir including print substance;
a valve socket, wherein the valve socket includes:
a concave surface;
a valve socket print substance channel; and
a valve socket air channel;
a valve body having a convex shape and located adjacent to the concave surface of the valve socket, the valve body including:
a valve body print substance channel that is misaligned with the valve socket print substance channel in response to the valve body being in a closed position; and
a valve body air channel that is misaligned with the valve socket air channel in response to the valve body being in the closed position;
wherein the valve body is rotated from the closed position to an open position such that:
the valve body print substance channel and the valve socket print substance channel are aligned to supply an amount of the print substance from the supply reservoir to a reservoir of an imaging device; and
the valve body air channel and the valve socket air channel are aligned to vent an amount of air from the reservoir of the imaging device to the supply reservoir, wherein the amount of air is the same as the amount of print substance.

13. The print substance supply of claim 12, wherein the supply of the print substance from the supply reservoir to the reservoir of the imaging device is stopped in response to the print substance received by the reservoir obstructing the valve socket air channel.

14. The print substance supply of claim 12, wherein the valve body is rotated from the open position to the closed position such that:
the valve body print substance channel and the valve socket print substance channel are misaligned;
the valve body air channel and the valve socket air channel are misaligned; and
print substance is unable to be supplied from the supply reservoir to the reservoir of the imaging device.

* * * * *